United States Patent
Koike et al.

[11] Patent Number: 6,033,722
[45] Date of Patent: Mar. 7, 2000

[54] METHOD FOR MANUFACTURING ELECTRODE

[75] Inventors: Takeshi Koike, Fukushima; Shigeo Kimura, Miyagi; Setuo Kawagishi, Miyagi; Tsunekazu Terui, Miyagi; Yoshiaki Hisagen, Miyagi, all of Japan

[73] Assignees: Sony Corporation, Tokyo; Mitsumaru Chemical Co. Ltd., Miyagi, both of Japan

[21] Appl. No.: 09/037,890

[22] Filed: Mar. 10, 1998

[51] Int. Cl.$^7$ .............................. B05D 5/12; H01M 4/04; H01M 4/46

[52] U.S. Cl. .............................. 427/58; 429/49; 427/122; 427/126.6

[58] Field of Search ........................... 427/58, 77, 126.6, 427/122; 429/49

[56] References Cited

U.S. PATENT DOCUMENTS

| | | | |
|---|---|---|---|
| 5,491,037 | 2/1996 | Kawakami | 429/49 |
| 5,569,555 | 10/1996 | Goldstein et al. | 429/49 |
| 5,789,095 | 8/1998 | Miyagawa et al. | 429/29 |

FOREIGN PATENT DOCUMENTS

| | | |
|---|---|---|
| 6-346160 | 12/1994 | Japan . |
| 10 092 417 | 9/1996 | Japan . |
| 2 258 081 | 1/1993 | United Kingdom . |

*Primary Examiner*—Shrive Beck
*Assistant Examiner*—Jennifer L. Kolb
*Attorney, Agent, or Firm*—Hill & Simpson

[57] ABSTRACT

An electrode plate in which electrode active material powder and an electrode mixture layer mainly composed of a thermoplastic binder are held on a conductive substrate is crushed. Then, the crushed materials are mixed with organic solvent so that a coating material made of the crushed electrode is prepared. The coating material made of the crushed electrode is applied to the surface of the conductive substrate so that an electrode is manufactured. As an alternative to this, an electrode mixture coating material made of electrode active material powder, thermoplastic resin and organic solvent is dried so that a solid electrode is obtained. Crushed materials obtained by crushing the solid electrode are mixed with organic solvent so that a coating material made of the crushed electrode is prepared. The coating material made of the crushed electrode is applied to the conductive substrate so that an electrode is manufactured. The manufacturing methods enable an electrode having excellent characteristics to be manufactured with a low cost by reusing a waste coating material generated because of a process for manufacturing electrodes or scraps of electrodes or electrodes included in spent batteries.

11 Claims, 8 Drawing Sheets

METHOD FOR MANUFACTURING ELECTRODE

BACKGROUND OF THE INVENTION

1. Field of the Invention

The present invention relates to a method for manufacturing an electrode in such a manner that scraps generated in a process for manufacturing electrodes and an electrode integrated in a spent cell are reused.

2. Prior Art

Hitherto, lead storage batteries and nickel-cadmium batteries have been known which are secondary batteries arranged to repeatedly be recharged/discharged. Moreover, a nickel-hydrogen storage battery, a lithium ion secondary battery and the like have been developed in about 1991, and then brought to the marketplace. Since the lithium secondary battery exhibits a high energy density, even though the lithium secondary battery is a costly battery, the lithium secondary battery is employed as a power source for a portable electronic apparatus, such as a camcorder, a portable telephone or a notebook personal computer. Moreover, the lithium secondary battery is expected to serve as a large-size secondary battery in the form of a power-storage-type battery for an automobile.

At first, the lithium secondary battery includes lithium metal serving as a negative-electrode active material. Since lithium has the most basic potential among all of metal materials and a low specific gravity of 0.534, use of lithium to serve as the negative-electrode active material is theoretically expected to obtain a great energy density.

If the lithium negative electrode is repeatedly subjected to a recharging and discharging cycle, it is changed into a significantly reactive granular shape. Thus, a satisfactorily long cycle life cannot be obtained. What is worse, lithium can grow into dendrite crystal which can reach the positive electrode. Thus, there arises a problem in that internal short is induced.

Therefore, investigations have been performed to use lithium in a stable form of lithium ions by occluding lithium into a host material. As a result, a lithium-ion secondary battery containing a carbon material serving as the host material (the negative-electrode active material) has been developed.

Lithium ions cannot easily be occluded in the carbon material in an industrial viewpoint. Therefore, lithium-ion batteries which have been put into practical use are arranged in such a manner that the carbon material is introduced into the battery in a state in which lithium ions are not occluded. After the battery has been assembled, the battery is electrically charged so that lithium ions are occluded in the carbon material.

Therefore, the positive-electrode active material must originally contain lithium ions. For example, lithium-containing composite oxides, such as cobalt acid lithium, nickel acid lithium and spinel manganese acid lithium, have been employed.

To constitute an electrode by using the foregoing carbon material and the lithium-containing composite oxide, the foregoing materials in the form of granular shape are mixed with a binder and organic solvent so that a mixed coating material is prepared. The prepared mixed coating material is applied to the surface of a collector (a conductive secondary battery), and then compression-molded.

The lithium-ion secondary battery including the above-mentioned electrode is free from fining of the negative electrode and growth of lithium into dendrite crystal. Thus, a high energy density can be realized, the safety can be improved and a long cycle life can be realized.

However, the lithium-ion secondary battery put into practical use has a multiplicity of problems which must be solved.

Although the energy density can be raised because of proper use of an active material, the realized energy density has not reached a theoretical energy density.

A technique for reusing scraps generated in the process for manufacturing the electrode and the electrode integrated in a spent cell is an important factor for the purpose of preventing environmental destruction. In particular, resources of cobalt which is the raw material of the cobalt acid lithium are insufficient and thus cobalt is a costly material. Therefore, cobalt must be reused.

Hitherto, cobalt acid lithium and nickel acid lithium have been subjected to various processes including a process for roasting the batteries and crushing, magnetic separation and screening processes. Thus, fractional collection of nickel or cobalt has been performed. As an alternative to this, electrodes have been heated and oxidized so that cobalt acid lithium and nickel acid lithium are collected.

However, the fractional collection of nickel or cobalt, which is a costly process, cannot be employed in the industrial viewpoint.

Although electrodes can be heated and oxidized with a low cost, the characteristics of the active material are changed during the hot oxidization process. Therefore, a secondary battery containing the recovered active material suffers from deterioration in the characteristics as compared with a new battery.

OBJECT AND SUMMARY OF THE INVENTION

In view of the foregoing, an object of the present invention is to provide a technique for reusing a waste coating material generated because of a process for manufacturing electrodes, waste electrodes or electrodes included in spent batteries and to provide a method of manufacturing an electrode with which an electrode having excellent characteristics can be manufactured with a low cost.

To achieve the above-mentioned object, according to one aspect of the present invention, there is provided a method of manufacturing an electrode including the steps of crushing a positive-electrode plate in which positive-electrode active material powder and a positive-electrode mixture layer mainly composed of a thermoplastic binder are held on a conductive substrate thereof, mixing the crushed materials with organic solvent so that a coating material made of the crushed positive electrode is prepared and applying the coating material made of the crushed positive electrode to the surface of the conductive substrate.

According to another aspect of the present invention, there is provided a method of manufacturing an electrode including the steps of drying a coating material made of a positive-electrode mixture composed of positive-electrode active material powder, a thermoplastic binder and organic solvent so as to be formed into a solid positive electrode, mixing crushed materials obtained by crushing the solid positive electrode with organic solvent so that a coating material made of the crushed positive electrode is prepared and applying the coating material made of the crushed positive electrode to the surface of a conductive substrate.

According to another aspect of the present invention, there is provided a method of manufacturing an electrode including the steps of crushing a negative-electrode plate in which negative-electrode active material powder and a negative-electrode active material layer mainly composed of a thermoplastic binder are held on a conductive substrate thereof, mixing the crushed materials with organic solvent so that a coating material made of the crushed negative electrode is prepared and applying the coating material made of the crushed negative electrode to the surface of the conductive substrate.

According to another aspect of the present invention, there is provided a method of manufacturing an electrode including the steps of drying a coating material made of a negative-electrode mixture composed of negative-electrode active material powder, a thermoplastic binder and organic solvent so as to be formed into a solid negative electrode, mixing crushed materials obtained by crushing the solid negative electrode with organic solvent so that a coating material made of the crushed negative electrode is prepared and applying the coating material made of the crushed negative electrode to the surface of a copper substrate.

The manufacturing method according to the present invention is structured in such a manner that a waste coating material made of an electrode mixture or crushed materials of manufactured electrodes are reused to manufacture an electrode. The manufacturing process according to the present invention has a simple structure that the process for crushing the electrode and the process for separating the electrode mixture layer are combined with the process for manufacturing a usual electrode. Therefore, the cost required to reuse the electrode can be reduced. Since the thus-manufactured electrode has excellent characteristics, use of the foregoing electrode improves the discharge characteristics and the cycle characteristics of the battery. Moreover, the positive electrode has significantly excellent characteristics as compared with a positive electrode which is manufactured by a usual method.

Other objects, features and advantages of the invention will be evident from the following detailed description of the preferred embodiments described in conjunction with the attached drawings.

DETAILED DESCRIPTION OF THE INVENTION

Embodiments of the present invention will now be described.

In the present invention, a waste coating material generated in the process for manufacturing electrodes or waste electrodes or electrodes integrated in spent electrodes, that is, manufactured electrodes are reused so that an electrode is manufactured.

Initially, a method of reusing a positive-electrode plate will now be described.

The positive electrode, which is reused, is in the form of a coating-type positive-electrode plate which is manufactured by coating a mixture for an electrode prepared by mixing active material powder for a positive electrode, a binder and organic solvent with each other, after which compressive molding is performed. The positive-electrode plate may be wastes of electrodes generated in the process for manufacturing the electrode or a spent electrode obtained by decomposing a battery.

The coating type positive-electrode plate is made of the following materials.

The positive-electrode active material is a lithium-containing composite oxide which is usually cobalt acid lithium, nickel acid lithium or spinel manganese acid lithium. Since cobalt acid lithium having excellent characteristics is a costly material because of insufficient resources, a great advantage can be obtained if it is reused.

Cobalt acid lithium is a black oxide having a hexagonal structure. Cobalt acid lithium is prepared by baking a mixture of lithium carbonate and cobalt carbonate in an atmosphere of air at a high temperature of about 900° C.

Since the lithium-containing composite oxide has poor conductivity, it is preferable that a conductive material, such as acetylene black, is added. The appropriate quantity of the conductive material is several % of the mixture layer for the positive electrode.

The binder is made of thermoplastic fluorine resin, such as vinylidene fluoride resin, because of satisfactory solvent resistance. The organic solvent for forming a coating material is solvent made of N-methyl pyrolidone and having compatibility with the foregoing binder.

The conductive substrate is in the form of elongated aluminum foil or the like.

To reuse the above-mentioned positive-electrode plate, the positive-electrode plate is crushed, and then the crushed material is dispersed in the organic solvent so that a coating material formed by crushing the positive electrode is prepared.

The positive-electrode plate is crushed by a crusher using high speed shearing force or impact. The crushing operation is performed in air or by using liquid, such as water, as a medium. The crusher is a vibrating mill, a turbo mill, a Henschel mixer, a desolver or the like. It is preferable that the turbo mill or the Henschel mixer is employed.

Figure 1:
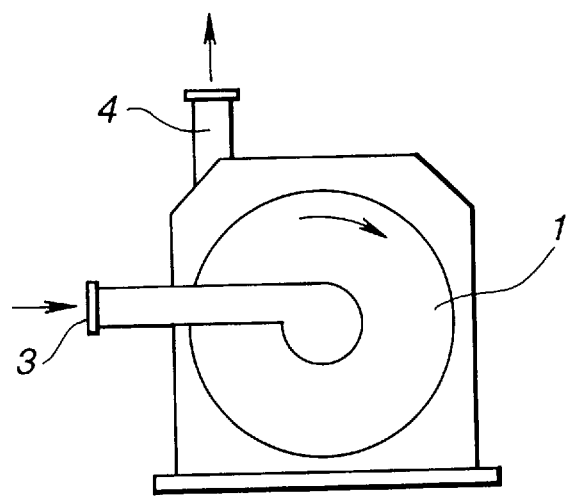
FIG. 1 is a side view showing an example of a crushing unit for crushing solid materials of electrode plates and a coating material made of an electrode mixture.
Figure 2A:
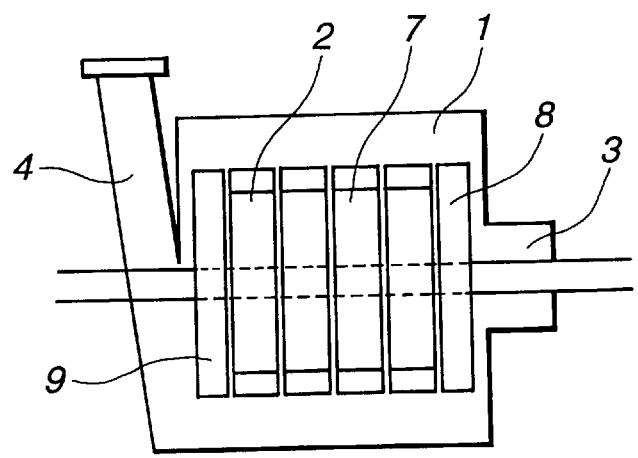
FIG. 2 is a diagram showing the structure in a crushing chamber of the unit shown in FIG. 1 and including FIG. 2A which is a schematic view showing the crushing chamber and FIG. 2B which is an enlarged view showing the inside portion of the crushing chamber.
Figure 2B:
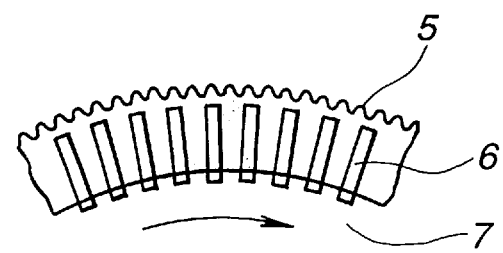

The structure of the turbo mill ("C600×500" trade name of Turbo Kogyo) will now be described with reference to FIGS. 1, 2A and 2B. FIG. 1 is a side view showing the turbo mill. FIG. 2A is a left-hand cross sectional view showing the turbo mill. FIG. 2B is a partially-enlarged view of FIG. 2A.

The turbo mill crushes the positive electrode and separates the positive-electrode mixture layer from the conductive substrate. The turbo mill includes a separation chamber 1 having a cylindrical space in which a separating unit 2 for separating the positive-electrode mixture layer from the conductive substrate is disposed.

A supply opening 3 for receiving the positive-electrode plate is formed in the central portion of one of side surfaces of the separation chamber 1. A discharge opening 4 is formed in the other side surface, the discharge opening 4 being disposed in a direction of a tangent line of the separation chamber 1. Thus, a cyclone is formed. The conductive substrate and the positive-electrode mixture layer subjected to the separation and crushing processes are allowed to pass through the cyclone by dint of an air flow, and then discharged through the discharge opening 4. As shown in FIG. 2B which is an enlarged view, a multiplicity of projections 5 are formed on the inner surface of the separation chamber 1, the projections 5 being arranged in parallel with the axis of the cylinder.

The separating unit 2 is disposed in the separation chamber 1. As shown in FIG. 2A, four cylindrical rotors 7 are disposed in the separating unit 2. Each cylindrical rotor 7 has fifty rotative blades, which are in parallel with the rotational shaft, on the outer surface thereof. Moreover, rotors 8 and 9 each having screw blades are disposed at the two ends of the four cylindrical rotors 7. The screw blades of the rotors 8 and 9 generate air blows which bring the positive-electrode plate introduced through the supply opening 3 to the inner surface of the separation chamber 1. Moreover, the screw blades generate air flows with which wind power of the cyclone is generated.

As shown in FIG. 2B, each of the cylindrical rotors 7 has a diameter somewhat smaller than the inner diameter of the separation chamber 1. As a result, a small space is created between the rotative blades 6 joined to the four cylindrical rotors 7 and the projections 5 formed on the inner wall of the separation chamber 1.

When the positive-electrode plates are introduced through the supply opening 3 of the turbo mill, the introduced positive-electrode plates are brought to the inner surface of the separation chamber 1 by dint of the air flow generated by the screw blade, and then moved by the cyclone. At this time, the positive-electrode plates are brought into contact with the projections 5 formed on the inner surface of the separation chamber 1 and the rotative blades 6 joined to the cylindrical rotors 7 during movement from the supply opening 3 to the discharge opening 4. Thus, the positive-electrode plate are crushed so that the electrode mixture layers are separated from the conductive substrates. The crushed and separated conductive substrates and the positive-electrode mixture layers, which have been moved to the cyclone by dint of the air flow, are allowed to pass through the cyclone, and then discharged through the discharge opening 4.

An example of the specifications of the turbo mill will now be described.

Figure 3:
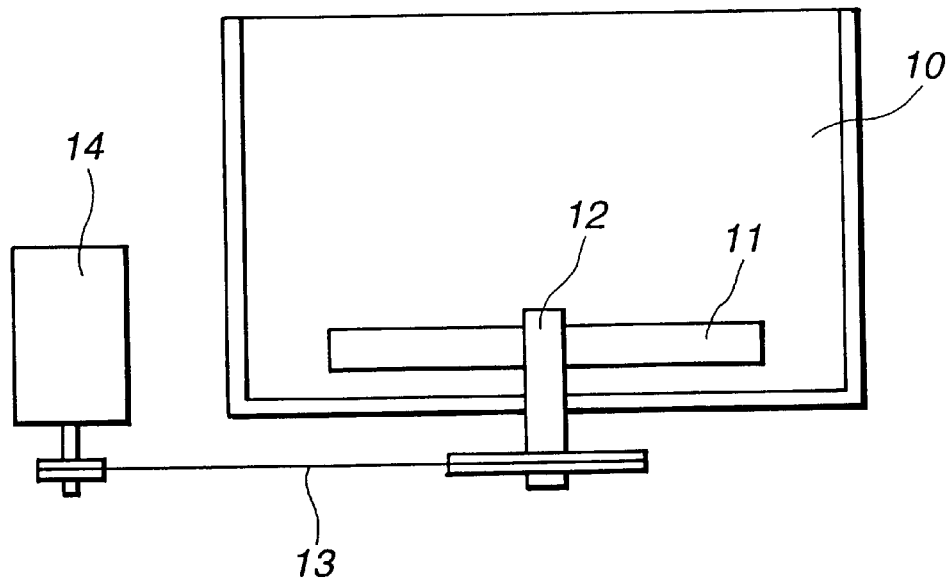
FIG. 3 is a schematic view showing another example of the crushing unit.

Size of Rotor:
outer diameter: 790 mm
height: 100 mm
Number of Rotors: four
Inner Diameter of Separation Chamber: 800 mm
Number of Revolutions of Shaft of Rotor: 1500 rpm to 3000 rpm Amount of Separation: 100 kg/hour
Flow Rate of Wind: 30 m$^3$/minute A Henschel mixer ("FM20B" trade name of Mitsui Miike) is shown in FIG. 3.

The Henschel mixer has a rotative blade 11 disposed in a cylindrical separation tank 10. The rotative blade 11 is joined to a vertical shaft 12 which penetrates the bottom portion of the separation tank 10. A V-belt 13 is arranged between a motor 14 and the vertical shaft 12. As a result, rotations of the motor 14 are transmitted to the vertical shaft 12 through the V-belt 13 so that the rotative blade 11 in the separation tank 10 is rotated at high speed.

When positive-electrode plates are introduced into the separation tank 10 of the Henschel mixer, great energy is generated between the rotative blade 11 and the positive-electrode plates by dint of the rotative blade 11 which is rotated at high speed. Moreover, also great energy is generated between the positive-electrode plates and the wall of the separation tank 10. As a result, strong shearing force is generated so that the positive-electrode plates are crushed and the positive-electrode mixture layers are separated from the conductive substrates.

An example of specifications of the Henschel mixer will now be described.

Rotative Blade: SR-A0
Capacity of Separation Tank: 20 L
Number of Revolutions: Variable Speed (not higher than 2100 rpm)

Crushed materials obtained by the crusher are mixtures of crushed materials of the conductive substrates and those of the positive-electrode mixture layers. Therefore, the differences in the particle sizes and specific gravities of the mixtures are used so that the conductive substrates and the positive-electrode mixture layers are separated from one another.

Figure 4:
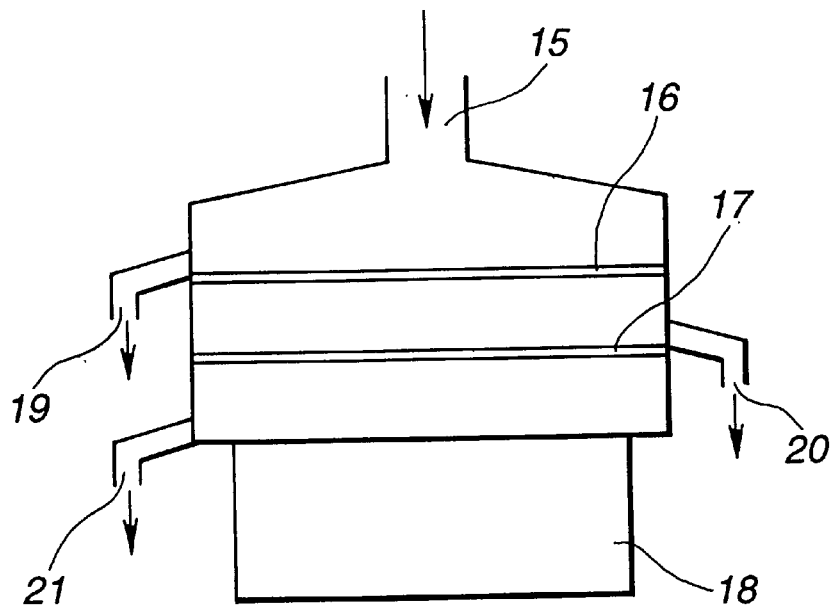
FIG. 4 is a schematic view showing a vibrating screen unit for separating crushed materials of electrode mixture layers and crushed materials of conductive substrates.

The separation of the two types of elements in the mixtures is performed by a vibrating screen unit (Sato Vibrating Screen Unit 1000D-2S manufactured by Shoei) having a structure, as shown in, for example, FIG. 4.

Vibration screening is performed by using the difference in the particle size to separate the crushed materials. The vibrating screen unit has a first screen net 16 and a second screen net 17 having different openings. A supply opening 15 for receiving crushed materials is formed in the upper portion of the unit. Moreover, discharge openings 19, 20 and 21 (hereinafter called "first, second and third discharge ports" in a downward direction) are formed at a position upper than the first screen net 16, a position between the first screen net 16 and the second screen net 17 and a position below the second screen net 17. Crushed materials stopped by the first screen net 16 are discharged through the first discharge opening 19, those allowed to pass through the first screen net 16 and stopped by the second screen net 17 are discharged through the second discharge opening 20, and only fine materials allowed to pass through the first screen net 16 and the second screen net 17 are discharged through the third discharge opening 21. Moreover, a vertical electric vibrator 18 of a special type is disposed below the vibrating screen unit so that the first screen net 16 and the second screen net 17 are vibrated at high speed.

The vibrating screen unit is arranged in such a manner that crushed materials introduced through the supply opening 15 and having relatively large particle sizes, that is, mainly crushed materials of the conductive substrates, are discharged through the first discharge opening 19 or the second discharge opening 20. Crushed materials having small particle sizes, that is, mainly crushed materials of the positive-electrode mixture layers, are allowed to pass through the first screen net 16 and the second screen net 17, and then discharged through the third discharge opening 21.

An example of the specifications of the vibrating screen unit will now be described.

Diameter of Vibrating Screen: 1000 mm
Number of Screen Nets: two
Frequency: 1500 c/mm, 50 Hz The number of the screen nets and the diameter are not limited to the above-mentioned specifications, and appropriate modification adaptable to the degree of crushing or the like is permitted.

To prepare a coating material made of the crushed materials of the positive electrodes, the crushed materials of the positive-electrode mixture layer separated by the above-mentioned vibrating screen unit are, together with the organic solvent having compatibility with the binder, introduced into the mixer so as to be mixed. At this time, thermoplastic binder may be added.

Then, the coating material made of the crushed materials is applied to the surface of the conductive substrate in the form of aluminum foil or the like, and then compression-molding is performed. Thus, a positive-electrode plate is manufactured.

As described above, the manufacturing method according to the present invention is arranged to manufacture the positive-electrode plate by reusing the positive-electrode plate. The method according to the present invention has a simple structure that the processes for crushing the positive-electrode plates and separating the crushed materials are combined with a process for manufacturing usual positive-electrode plates. Therefore, the positive-electrode plate can be reused at a low cost.

The positive-electrode plate made of the crushed positive-electrode mixture layer has characteristics superior to those of a positive-electrode plate made of an active material which is not used to form the positive-electrode mixture layer. Thus, the discharge characteristics and the cycle life of the battery can be improved. The reason for this, which has not been revealed yet, will now be considered.

The positive-electrode active material, which has been formed into the composition of the positive-electrode mixture layer, has the strong interaction with the binder in the mixture. Thus, a strong adsorptive film can be formed. The positive-electrode active material having the above-mentioned adsorptive film formed thereon has an excellent filling characteristic. Thus, a positive-electrode mixture layer having a high fill density can be formed. Moreover, the positive-electrode active material having the adsorptive film exhibits an excellent adhesive property with respect to the conductive substrate. Therefore, a strong positive-electrode plate can be manufactured. Moreover, the interaction with the conductive substrate which is mixed with the crushed materials improves the characteristics of the positive-electrode active material. Thus, it can be considered that the discharge characteristics and the cycle line are considered.

Crushed materials of the positive-electrode mixture layer separated from the crushed materials of the positive-electrode plates are employed to prepare the coating material made of the crushed materials. Also the crushed materials of the conductive substrates contribute to improvement in the characteristics of the positive-electrode active materials. Therefore, it is preferable that crushed materials of the conductive substrates are mixed in a quantity from 0.05 wt % to 5 wt %. If the quantity of the crushed materials of the conductive substrates is smaller than 0.05 wt %, a required effect cannot be obtained. If the quantity of the crushed materials of the conductive substrates exceeds 5 wt %, the ratio of the active material is lowered. In this case, the capacity of the battery is undesirably reduced. Therefore, the preferred quantity of the crushed materials of the conductive substrate is 0.05 wt % to 2 wt %.

The ratio of the crushed materials of the conductive substrate can be controlled by changing the degree of crushing. Since the conductive substrate is furthermore fined as the crushing impact is enlarged, crushed materials are allowed to pass through the screen in a larger quantity. Therefore, the conductive substrates are mixed with the crushed materials in a larger quantity. If the crushing impact is too small, the quantity of the conductive substrates which are mixed with the crushed materials is reduced.

The positive-electrode plate is manufactured as described above by reusing the positive-electrode plate. As an alternative to this, the positive-electrode plate can be manufactured by reusing a waste coating material of the mixture for the positive electrode.

To reuse the coating material of the mixture for the positive electrode, the coating material is dried so that a solid positive electrode is obtained. Then, the solid positive electrode is crushed so that crushed materials of the solid positive electrodes are, together with the organic solvent, mixed so that the coating material made of the crushed positive electrodes is prepared. Then, the coating material made of the crushed positive electrode is applied to the surface of the conductive substrate, and then compression-molded. Thus, the positive-electrode plate is manufactured. The solid positive electrode is crushed by the above-mentioned crushing unit.

Since the above-mentioned method has a simple process in which the process for crushing the solid positive electrode is combined with the process for manufacturing a usual positive-electrode plate, the coating material of the mixture for the positive electrode can be reused at a low cost. The above-mentioned positive-electrode plate has excellent characteristics as compared with the positive-electrode plate made of active materials which are not used to form the positive electrode. Therefore, the discharge characteristics and the cycle life of the battery can be improved. That is, the above-mentioned method enables a positive-electrode plate having excellent characteristics to be manufactured by reusing the coating material of the mixture for the positive electrode at a low cost.

Since the solid positive electrode has no conductive substrate, it is preferable that aluminum foil or aluminum powder is mixed to improve the characteristics which are realized by dint of the interaction with aluminum when the crushed materials are employed. It is preferable that the quantity of the aluminum material is 0.05 wt % to 5 wt % of the overall quantity of the powder, more preferably 0.05 wt % to 2 wt %.

A method of manufacturing a negative-electrode plate by reusing the manufactured negative-electrode plate will now be described.

The negative electrode attempted to be reused is a coating-type negative-electrode plate which is manufactured by applying, to the surface of a collector, a negative-electrode mixture coating material prepared by mixing the negative-electrode active material powder, the binder and the organic solvent and by performing compression-molding. The negative-electrode plate may be a waste of an electrode generated in the process for manufacturing the electrode or a spent electrode obtained by decomposing the battery.

The materials of the negative electrode will now be described.

The negative-electrode active material is a carbon material to and from which lithium can be doped/removed. The carbon material may be crystallized graphite or coke (for example, pitch coke, needle coke, petroleum coke or the like), the degree of crystallization of which is low.

The binder is made of thermoplastic fluororesin, such as vinylidene fluoride, because of its excellent solvent resistance. As the organic solvent for forming a coating material, solvent, such as N-methyl pyrolidone, having compatibility with the foregoing binder is employed.

The conductive substrate may be elongated copper foil or the like.

To reuse the negative-electrode plate, the negative-electrode plate is crushed, and then the crushed materials are sectioned into crushed materials of the negative-electrode mixture layer and those of the conductive substrates. The crushed materials of the negative-electrode mixture layers are mixed with the organic solvent so that a coating material made of crushed materials of negative electrodes is prepared which is then applied to the conductive substrate made of copper foil or the like. Then, compression molding is performed so that the negative-electrode plate is manufactured. The process for crushing the negative-electrode plate and the process for separating the negative-electrode mixture layer from the crushed materials can be performed by using the above-mentioned crushing unit or the vibrating screen unit.

The above-mentioned method enables the process for crushing the negative-electrode plates and the process for separating the crushed materials to simply be combined with the process for manufacturing usual negative-electrode plates. Therefore, the negative-electrode plate can be reused with a low cost. The thus-manufactured negative-electrode plate has characteristics superior to those of a negative-electrode plate containing a new active material. Therefore, the discharge characteristics and the life time of the battery can be improved. That is, the above-mentioned method enables a negative-electrode plate having excellent characteristics to be manufactured at a low cost by reusing a spent negative-electrode plate.

The reason why the negative-electrode plate having the excellent characteristics can be obtained has not be detected yet. A consideration can be made that the adsorptive film formed on the surface of the negative-electrode active material raises the fill density of the active material to improve the adhesive property of the active material to the collector.

Thus, a new negative-electrode plate can be manufactured by reusing the coating-type negative-electrode plate. The negative-electrode plate can be manufactured by reusing the waste negative-electrode mixture coating material.

In this case, the negative-electrode mixture coating material is dried so that a solid negative electrode is manufactured. Crushed materials obtained by crushing the solid negative electrode is mixed with the organic solvent so that the coating material made of the crushed negative electrode is prepared. Then, the coating material made of the crushed negative electrode is applied to the surface of the conductive substrate, and then compression molding is performed. Thus, the negative-electrode plate is manufactured. The solid negative electrode is crushed by the above-mentioned crushing unit.

Also the above-mentioned method is constituted by simply combining the process for crushing the solid negative electrode with the process for manufacturing a usual negative-electrode plate. Therefore, the negative-electrode mixture coating material can be reused at a low cost.

Moreover, the thus-manufactured negative-electrode plate has characteristics superior to those of a negative-electrode plate containing a new active material. Therefore, the discharge characteristics and the cycle life of the battery can be improved. That is, the above-mentioned method enables a negative-electrode plate having excellent characteristics to be manufactured at a low cost by reusing the solid negative electrode.

A plurality of the thus-manufactured positive-electrode plates and negative-electrode plates are stacked through separators so as to be accommodated in a battery can in which non-aqueous electrolyte is enclosed. Thus, the positive and negative electrodes of a non-aqueous electrolyte secondary battery are obtained.

The separators are made of fine-porous film made of polyethylene or polypropylene.

The non-aqueous electrolyte is prepared by dissolving electrolyte in non-aqueous solvent.

The electrolyte is made of lithium salt which may be hexafluoride lithium phosphate, lithium perchlorate or tetrafluoride lithium borate.

The non-aqueous solvent may be ethylene carbonate, propylene carbonate, dimethyl carbonate, diethyl carbonate, ethylmethyl carbonate or the like.

EXAMPLES

Examples of the present invention will now be described with reference to results of experiments.

Example 1

A coating material made of a positive-electrode mixture was prepared by mixing 91 parts by weight of cobalt acid lithium, 6 parts by weight of graphite (the conductive material) and 3 parts by weight of vinylidene fluoride resin. The coating material made of the positive-electrode mixture was applied to aluminum foil so that a positive-electrode plate serving as a raw material in the form of crushed material to be used in the latter process was manufactured.

Then, the positive-electrode plate for use as the material was crushed by the turbo mill at a revolving speed of 3000 rpm. Then, a 150-mesh screen was used to screen the crushed materials so that the crushed materials were separated into crushed materials of aluminum foil and those of a positive-electrode mixture layer. The crushed materials of the positive-electrode mixture layer were quantitatively analyzed. As a result, a fact that aluminum foil was contained by 2 wt %.

Then, mixture solvent of 100 parts by weight of the crushed materials of the positive-electrode mixture layer and 600 parts by weight of 80 vol % of N-methyl pyrolidone and 20 vol % methylethyl ketone were mixed so that a coating material made of the crushed positive electrode was prepared. The coating material made of the crushed positive electrode was applied to the two sides of aluminum foil having a thickness of 20 $\mu$m so that a layer having a thickness of 80 $\mu$m was formed on each of the two sides. Then, a roller pressing machine was used so that compression molding was performed. Thus, a positive-electrode plate was manufactured. The positive-electrode plate was introduced into a non-aqueous electrolyte secondary battery containing graphite serving as the negative-electrode active material thereof.

Example 2

A similar process to that according to Example 1 was performed except for the number of revolutions of the turbo mill being 2500 rpm for crushing the positive-electrode plate so that a positive-electrode plate was manufactured. The positive-electrode plate was introduced into the non-aqueous electrolyte secondary battery having the graphite serving as the negative-electrode active material. Note that the quantity of aluminum contained in the crushed materials of the positive-electrode mixture layer was 1.5 wt %.

Example 3

A similar process to that according to Example 1 was performed except for the number of revolutions of the turbo mill being 2000 rpm for crushing the positive-electrode plate so that a positive-electrode plate was manufactured. The positive-electrode plate was introduced into the non-aqueous electrolyte secondary battery having the graphite serving as the negative-electrode active material. Note that the quantity of aluminum contained in the crushed materials of the positive-electrode mixture layer was 1.0 wt %.

Example 4

A similar process to that according to Example 1 was performed except for the number of revolutions of the turbo mill being 1500 rpm for crushing the positive-electrode plate so that a positive-electrode plate was manufactured. The positive-electrode plate was introduced into the non-aqueous electrolyte secondary battery having the graphite serving as the negative-electrode active material. Note that the quantity of aluminum contained in the crushed materials of the positive-electrode mixture layer was 0.3 wt %.

The discharge characteristics of the thus-manufactured non-aqueous electrolyte secondary batteries were evaluated. Results were shown in FIG. 5. Note that recharging and discharging conditions were as follows.
Recharging Conditions
  Recharging with Constant Electric Current and Constant Voltage
  Recharging Voltage: not higher than 4.20 V
  Recharging Electric Current: not higher than 700 mA
  Recharging Period: 2.5 hours
  Temperature During Recharging: constant 23° C.
Discharging Conditions
  Discharge with Constant Electric Current
  Discharge Electric Current: constant 400 mA
  Temperature During Discharge: constant –10° C.

Figure 5:
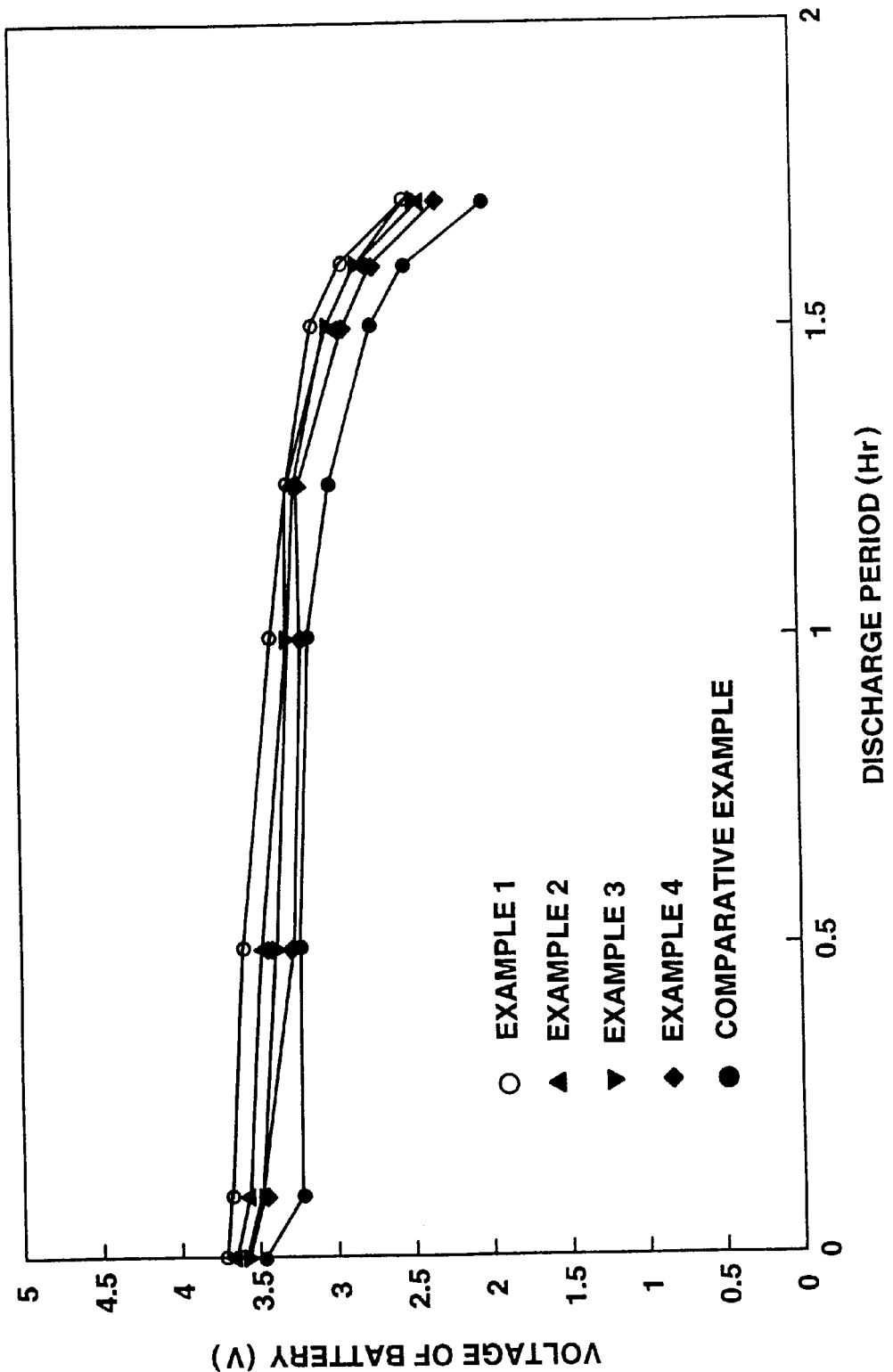
FIG. 5 is a graph showing discharge characteristics of a battery having crushed materials of positive-electrode mixture layers crushed by a turbo mill.

Also the discharging characteristics of a usual non-aqueous electrolyte secondary battery (a comparative example) having cobalt acid lithium serving as the positive-electrode active material and graphite serving as the negative-electrode active material were shown in FIG. 5.

As shown in FIG. 5, the batteries according to Examples 1 to 4 each including the positive electrode made of the crushed materials of the positive-electrode mixture layer were free from considerable voltage drop as compared with the battery according to the comparative example. Thus, excellent discharge characteristics were realized. As a result, a fact was confirmed that the positive electrode made of the crushed materials of the positive-electrode mixture layer was effective to improve the characteristics of the battery.

The discharge characteristics was improved in proportion to the quantity of aluminum. Therefore, a fact was confirmed that a mixture of aluminum with the crushed materials of the positive-electrode mixture layer improved the characteristics. If the quantity of aluminum is too large, the quantity of the introduced positive-electrode active material is reduced. Therefore, it is preferable that the quantity of aluminum in the crushed materials is 0.05 wt % to 5 wt %.

Example 5

500 parts by weight of water were injected into 100 parts by weight of a positive-electrode plate for the material manufactured by a method similar to that according to Example 1. Then, the Henschel mixer was rotated at 1200 rpm so that the positive-electrode plate was crushed. The crushed materials was screened so that the crushed materials were separated into crushed materials of aluminum foil and those of the positive-electrode mixture layers. The crushed materials of the positive-electrode mixture layers were dried at 110° C. for 24 hours. A fact was confirmed that the crushed materials of the positive-electrode mixture layers contained aluminum foil by 0.4 wt %.

Then, 100 parts by weight of the crushed materials of the positive-electrode mixture layer and 600 parts by weight of N-methyl pyrolidone were mixed so that a coating material made of the crushed positive electrode was prepared. The coating material made of the crushed positive electrode was applied to the two sides of aluminum foil having a thickness of 25 $\mu$m in such a manner that a layer having a thickness of 80 $\mu$m was formed on each side. Then, a roller pressing machine was used so that compression molding was performed. Thus, a positive-electrode plate was manufactured. The thus-manufactured positive-electrode plate was introduced into a non-aqueous electrolyte secondary battery containing graphite serving as the negative-electrode active material.

The cycle characteristics of the thus-manufactured non-aqueous electrolyte secondary battery were examined. Results were shown in FIG. 6. Note that the energy density shown in FIG. 6 was a value obtained when the initial energy density was made to be 100 %. The recharging and discharging conditions were as follows:
Recharging Conditions
  Recharging with Constant Electric Current and Constant Voltage
  Recharging Voltage: not higher than 4.20 V
  Recharging Electric Current: not higher than 700 mA
  Recharging Period: 2.5 hours
  Temperature During Recharging: constant 23° C.
Discharging Conditions
  Discharge with Constant Electric Current
  Discharge Electric Current: constant 400 mA
  Voltage at which Discharge was ended: 2.75 V
  Temperature During Discharge: constant 23° C.

Figure 6:
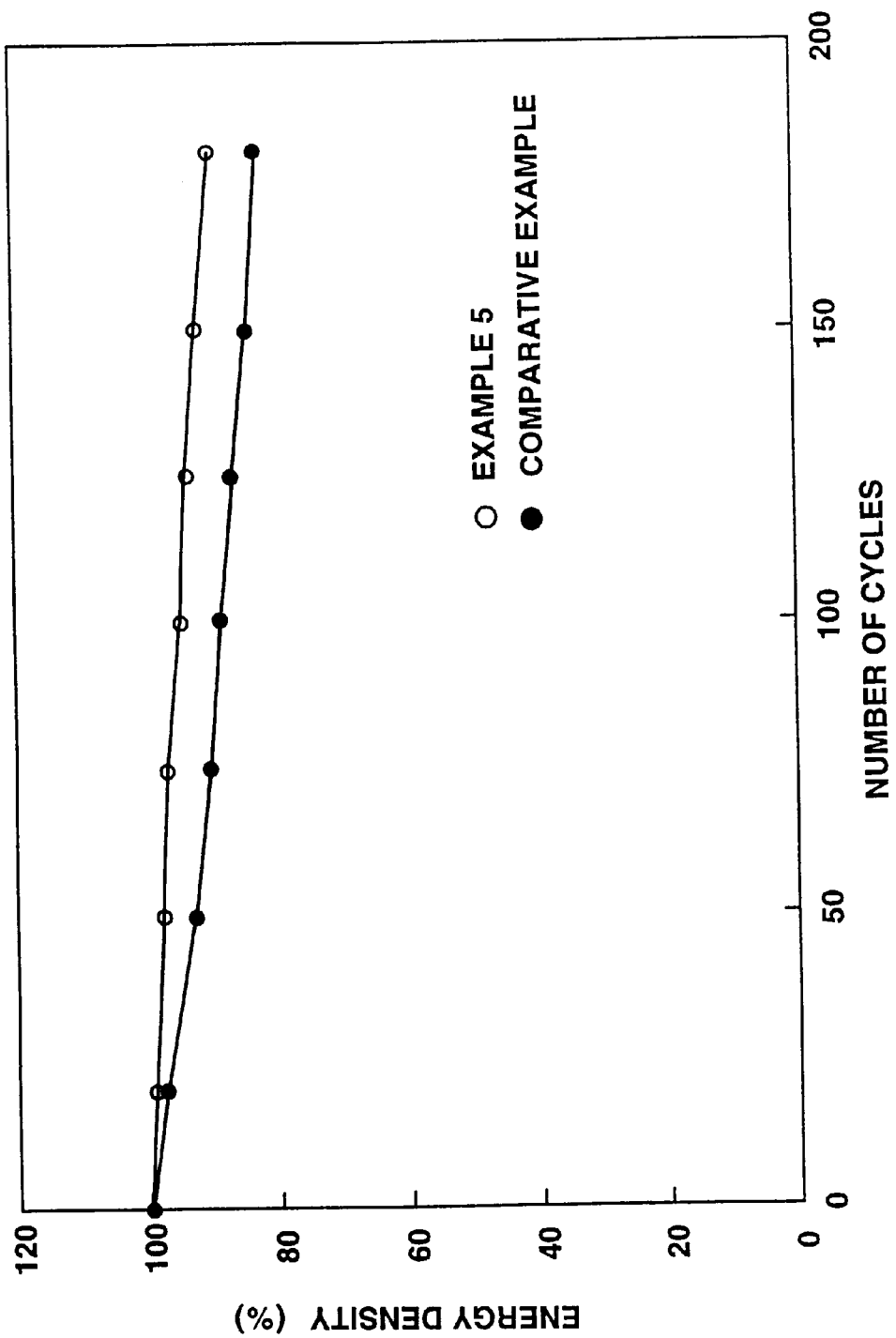
FIG. 6 is a graph showing cycle characteristics of a battery having crushed materials of positive-electrode mixture layers crushed by a Henschel mixer.

FIG. 6 as well as shows the cycle characteristics of the non-aqueous electrolyte secondary battery according to the comparative example.

As described above, the positive-electrode plate for the material was crushed by the Henschel mixer with water serving as a medium. The battery according to Example 5 and including the crushed materials of the positive-electrode mixture layer was free from considerable reduction in the energy density as compared with the battery according to the comparative example. Thus, excellent cycle characteristics were realized.

As a result, the positive-electrode plate for the material may be crushed by the turbo mill or the Henschel mixer. That is, the type of the crushing unit is not limited. Moreover, water may be used to serve as the medium when the crushing operation is performed.

Example 6

The coating material made of a positive-electrode mixture prepared by a method similar to that according to Example 1 was dried so that a solid positive electrode was formed. Then, 2 wt % of aluminum foil was mixed with the solid positive electrode, and then the mixture was crushed by the Henschel mixer at 1200 rpm for 20 minutes. A similar process to that according to Example 1 was performed except for the coating material made of the crushed positive electrode being prepared by using the above-mentioned crushed materials. Thus, a positive-electrode plate was manufactured, and then introduced into a non-aqueous electrolyte secondary battery including graphite serving as the negative-electrode active material.

Figure 7:
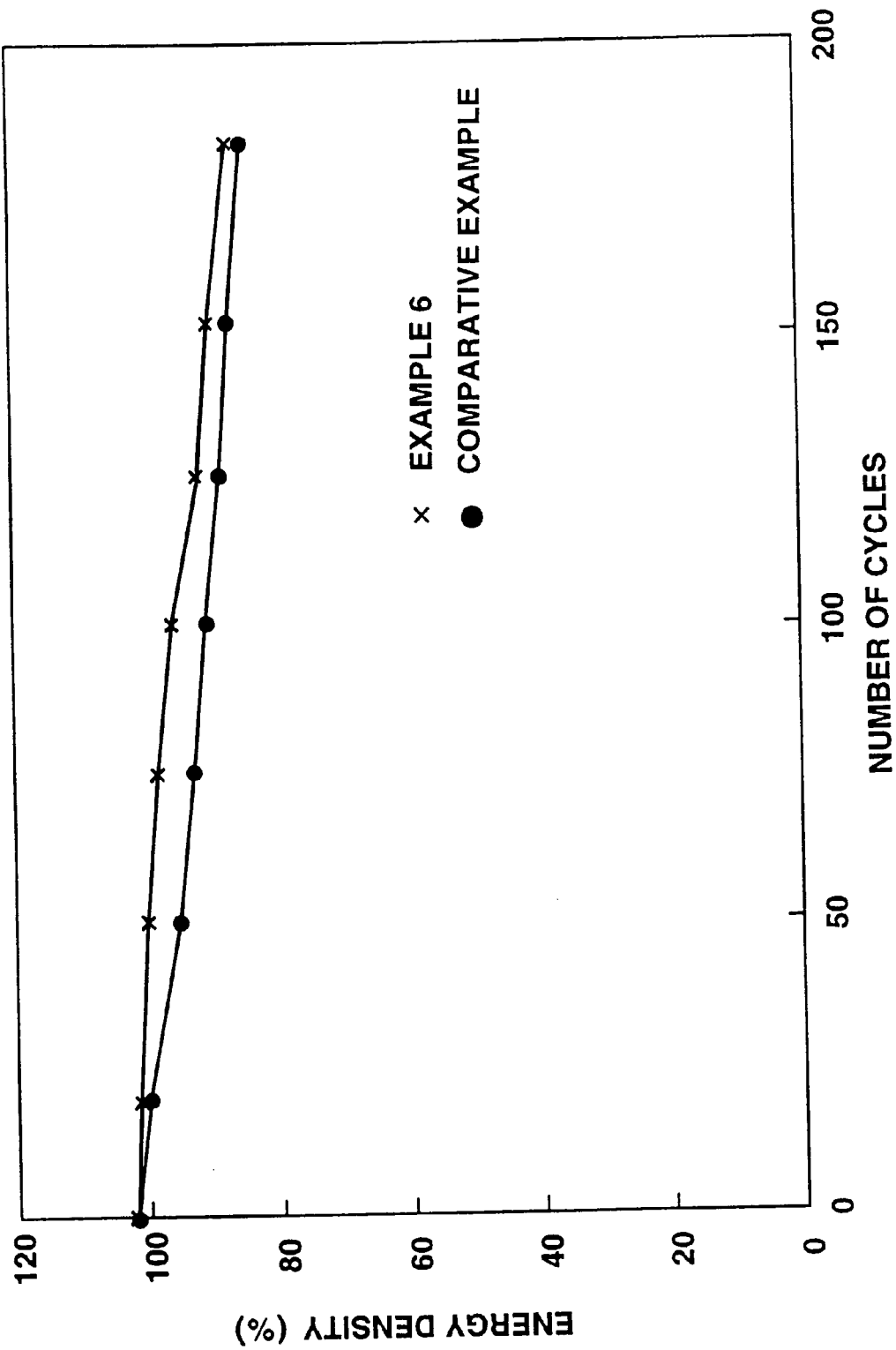
FIG. 7 is a graph showing cycle characteristics of a battery having crushed materials of a solidified coating material made of positive-electrode mixtures.

The cycle characteristics of the thus-manufactured non-aqueous electrolyte secondary battery were examined by a method similar to that according to Example 5. Results were shown in FIG. 7. FIG. 7 as well as shows the cycle characteristics of a non-aqueous electrolyte secondary battery according to the comparative example.

The positive-electrode plate was manufactured by using the crushed materials obtained by crushing the solid coating material made of a positive-electrode mixture. The battery according to Example 5 including the above-mentioned crushed materials was free from considerable reduction in the energy density as compared with the battery according to the comparative example. Thus, excellent cycle characteristics were obtained.

As can be understood from the above-mentioned facts, also the coating material made of a positive-electrode mixture may be reused similarly to the positive-electrode plate. When the positive electrode was manufactured by using the coating material made of a positive-electrode mixture, the characteristics of the battery was improved.

Example 7

Initially, 90 parts by weight of graphite powder and 10 parts by weight of vinylidene fluoride resin were mixed so that a negative-electrode mixture coating material was prepared. The thus-prepared negative-electrode mixture coating material was applied to copper foil so that a negative-electrode plate for use as a crushed material in the latter process was manufactured.

Then, 500 parts by weight of water was injected into 100 parts by weight of the negative-electrode plate for the material, and then crushed by the Henschel mixer at 1200 rpm. Then, a vertical and direct-current type classifier was used to separate the crushed materials into crushed materials of copper foil and crushed materials of a negative-electrode mixture layer. Then, the crushed materials of the negative-electrode mixture layer were gathered by a 5A-type filter, and then dried at 110° C. for 24 hours.

Then, 100 parts by weight of the crushed materials of the negative-electrode mixture layer and 800 parts by weight of N-methyl pyrolidone were mixed so that a coating material made of the crushed negative electrode was prepared. The coating material made of the crushed negative electrode was applied to the two sides of copper foil having a thickness of 20 μm in such a manner that a layer having a thickness of 100 μm was formed on each side. Then, a roller pressing machine was used so that compression molding was performed to manufacture a negative-electrode plate. The thus-manufactured negative-electrode plate was included in a non-aqueous electrolyte secondary battery having cobalt acid lithium serving as the positive-electrode active material.

Figure 8:
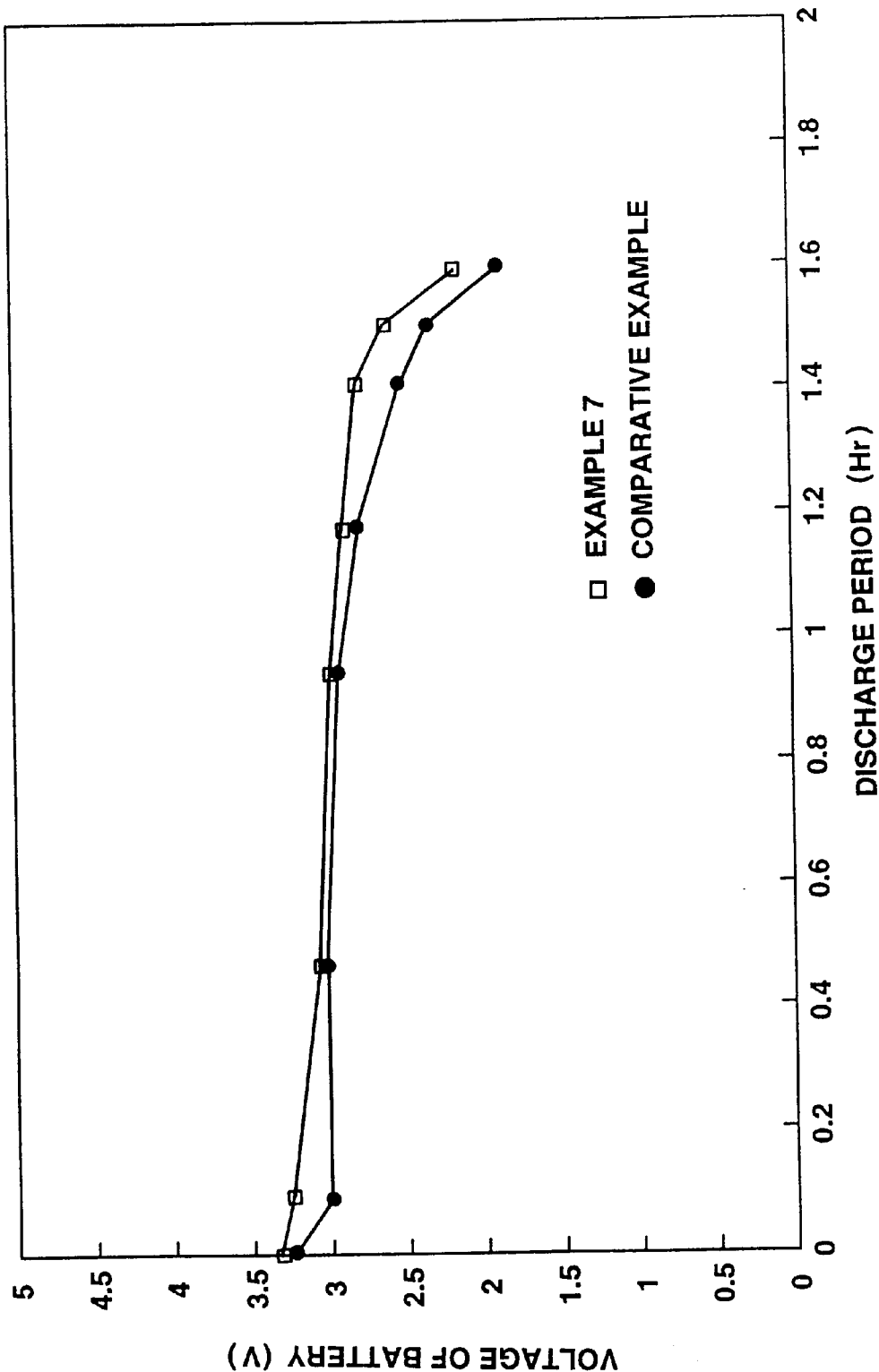
FIG. 8 is a graph showing discharge characteristics of a battery having crushed materials of negative-electrode plates.

The discharge characteristics of the thus-manufactured non-aqueous electrolyte secondary battery were examined by a method similar to that according to Example 1. Results were shown in FIG. 8. FIG. 8 as well as shows the discharge characteristics of the non-aqueous electrolyte secondary battery according to the comparative example.

As shown in FIG. 8, the battery according to Example 7 having the negative electrode formed by the crushed materials of the negative-electrode mixture layer was free from considerable voltage drop as compared with the battery according to the comparative example. Thus, excellent discharge characteristics were realized. As a result, a fact was confirmed that the negative electrode including the crushed materials of the negative-electrode mixture layer improved the characteristics of the battery.

Example 8

A process similar to that according to Example 1 was performed for preparing the coating material made of the crushed positive electrode except for 50 parts by weight of lithium acid cobalt being substituted for 50 parts by weight of 100 parts by weight of the crushed materials of the positive-electrode mixture layer. Thus, a positive-electrode plate was manufactured.

A process similar to that according to Example 7 was performed for preparing a coating material made of the crushed negative electrode except for 50 parts by weight of graphite powder being substituted for 50 parts by weight of 100 parts by weight of the crushed materials of the negative-electrode mixture layer. Thus, a negative-electrode plate was manufactured.

Then, the manufactured positive-electrode plate and the negative-electrode plate were introduced into a non-aqueous electrolyte secondary battery.

Figure 9:
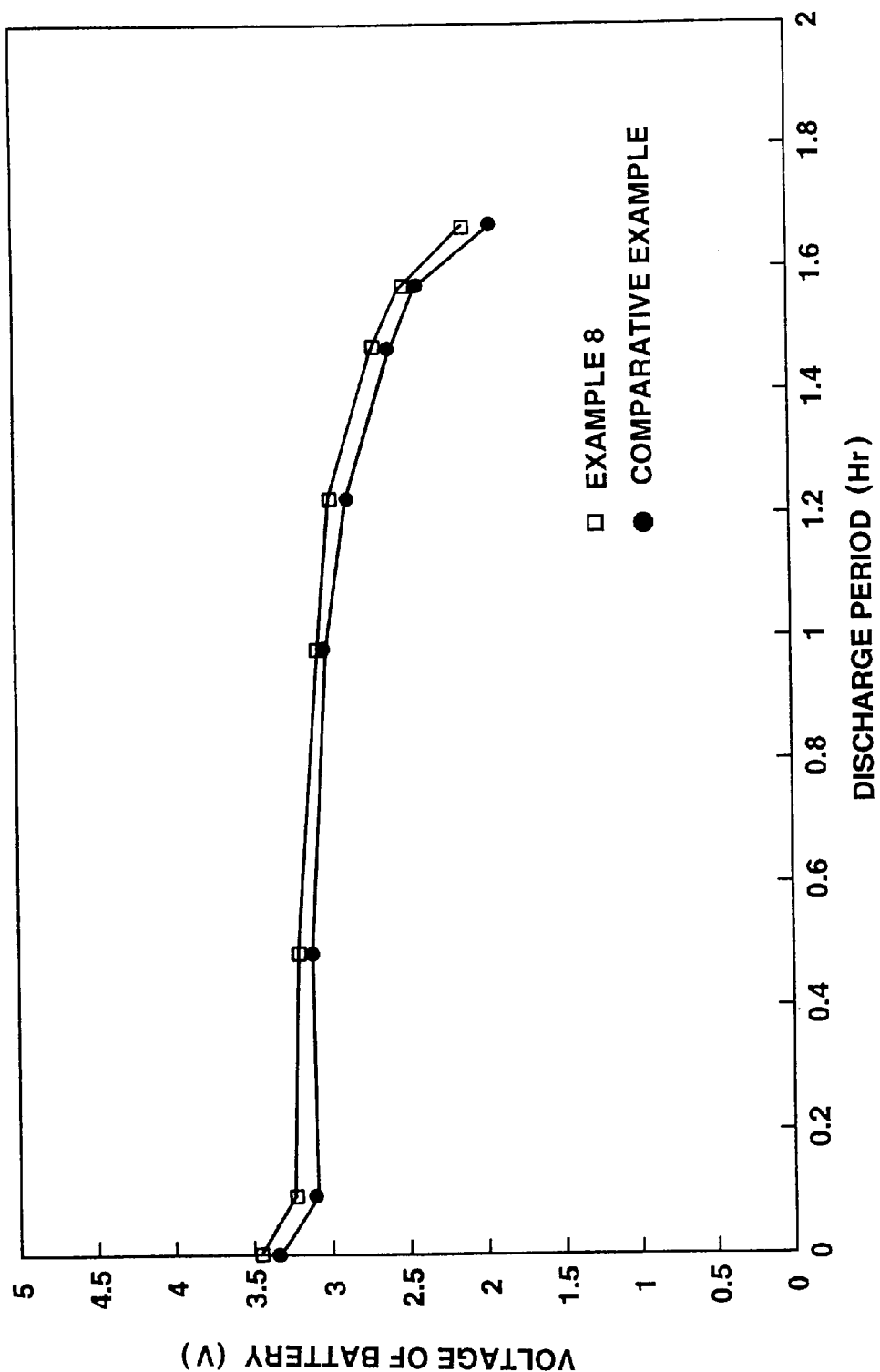
FIG. 9 is a graph showing discharge characteristics of a battery having mixtures of crushed positive-electrode plates and lithium acid cobalt and mixtures of crushed materials of negative-electrode plates and graphite powder.

The discharge characteristics of the non-aqueous electrolyte secondary battery were examined by a method similar to that according to Example 1. Results were shown in FIG. 9. FIG. 9 as well as shows the discharge characteristics of the non-aqueous electrolyte secondary battery according to the comparative example.

As can be understood from FIG. 9, the battery according to Example 8 and including the mixture of crushed materials of the positive-electrode mixture layer and the lithium acid cobalt and the mixture of the crushed materials of the negative-electrode mixture layer and graphite has characteristics inferior to those of the battery according to Example 1 and including only the crushed materials of the electrode mixture layer.

Thus, a fact was understood that the crushed materials of the positive-electrode mixture layer and the lithium acid cobalt may be used together and the crushed materials of the negative-electrode mixture layer and graphite may be used together. Moreover, if the quantity of the crushed materials of the positive-electrode mixture layer and that of the crushed materials of the negative-electrode mixture layer were too small, a required improvement was not realized.

Example 9

A load was applied to a lithium-ion secondary battery so that the battery was completely discharged. Then, two ends of the battery can was cut. Then, electrolyte was removed, the positive-electrode plate, the negative-electrode plate and the separators were separated, and then the positive-electrode plate and the negative-electrode plate were removed. The removed positive-electrode plate and the negative-electrode plate were crushed by the Henschel mixer at 1200 rpm. Thus, the positive-electrode plate and the negative-electrode plate were separated into crushed materials of the positive-electrode mixture layer and those of aluminum foil. Moreover, separation into the crushed materials of the negative-electrode mixture layer and crushed materials of copper foil was performed.

Then, 100 parts by weight of the crushed materials of a positive-electrode mixture layer and 700 parts by weight of N-methyl pyrolidone were mixed so that a coating material made of the crushed positive electrode was prepared.

Moreover, 100 parts by weight of the crushed materials of the negative-electrode mixture layer and 900 parts by weight of N-methyl pyrolidone were mixed so that a coating material made of the crushed negative electrode was prepared.

The coating material made of the crushed positive electrode was applied to the two sides of aluminum foil having a thickness of 25 μm in such a manner that a layer having a thickness of 80 μm was formed on each side. Then, a roller pressing machine was used so that compression molding was performed. Thus, a positive-electrode plate was manufactured.

The coating material made of the crushed negative electrode was applied to the two sides of copper foil having a thickness of 20 μm in such a manner that a layer having a thickness of 100 μm was formed on each side. Then, the roller pressing machine was used so that compression molding was performed. Thus, a negative-electrode plate was manufactured.

The thus-manufactured positive-electrode plate and the negative-electrode plate were introduced into a non-aqueous electrolyte secondary battery.

Example 10

A positive-electrode plate manufactured by a method similar to that according to Example 9 was introduced into a non-aqueous electrolyte secondary battery containing graphite serving as the negative-electrode active material.

Example 11

A negative-electrode plate manufactured by a method similar to that according to Example 9 was introduced into a non-aqueous electrolyte secondary battery containing cobalt acid lithium serving as the positive-electrode active material.

Figure 10:
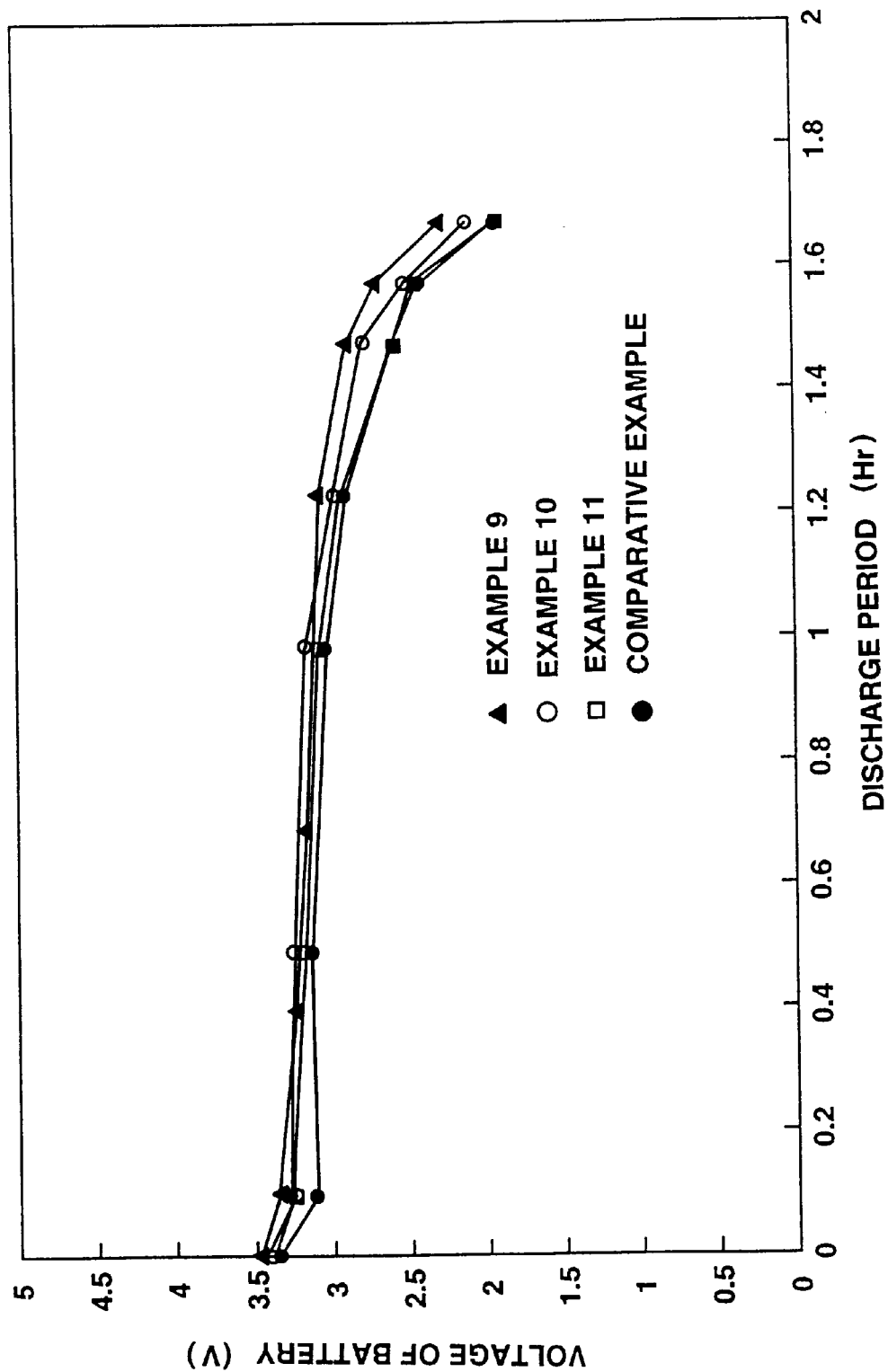
FIG. 10 is a graph showing discharge characteristics of a battery having crushed materials of positive-electrode plates and negative-electrode plates obtained by decomposing batteries.

The discharge characteristics of the thus-manufactured non-aqueous electrolyte secondary battery were examined by a method similar to that according to Example 1. Results were shown in FIG. 10. FIG. 10 also shows the discharge characteristics of the non-aqueous electrolyte secondary battery according to the comparative example.

As can be understood from FIG. 10, the battery according to Example 9 has the positive electrode made of the crushed materials of the positive-electrode mixture layer and the negative electrode made of the crushed materials of the negative-electrode mixture layer. The battery according to Example 10 has the negative-electrode plate made of a usual material and the positive electrode made of the crushed materials of the positive-electrode mixture layer. The battery according to Example 11 has the positive-electrode plate made of a usual material and the negative-electrode plate made of the crushed materials of the negative-electrode mixture layer. The batteries according to the foregoing examples are free from considerable voltage drop as compared with the battery according to the comparative example. Thus, excellent discharge characteristics can be realized. In particular, the battery according to Example 9 has excellent discharge characteristics.

As a result, use of crushed materials of an electrode mixture layer to form both of the positive electrode and the negative electrode improves the characteristics of the battery.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A method of manufacturing an electrode comprising the steps of:

crushing a positive-electrode plate in which positive-electrode mixture layers comprising a thermoplastic binder, a positive-electrode active material and conductive substrates are crushed to form a powder comprising the thermoplastic binder, positive-electrode active material powder and crushed conductive substrates and which is held on a solid formed conductive substrate comprising aluminum foil;

at least partially separating the positive-electrode active material powder from the crushed conductive substrates to yield a powder comprising positive-electrode active material powder and not more than 5 wt % crushed conductive substrates;

mixing the positive-electrode active material powder and not more than 5 wt % crushed conductive substrates with organic solvent so that a coating material is prepared; and applying the coating material to the surface of the conductive substrate.

2. A method of manufacturing an electrode according to claim 1, wherein the crushed materials obtained by crushing the positive-electrode plate contain aluminum by 0.05 wt % to 5 wt %.

3. A method of manufacturing an electrode according to claim 2, wherein the positive-electrode active material powder is cobalt acid lithium powder, and the crushed materials obtained by crushing the positive-electrode plate contain aluminum by 0.05 wt % to 5 wt %.

4. A method of manufacturing an electrode according to claim 1, wherein the positive-electrode plate is obtained by decomposing a spent battery.

5. A method of manufacturing an electrode comprising the steps of:

drying a coating material made of a positive-electrode mixture composed of positive-electrode active material powder, a thermoplastic binder aluminum and organic solvent so as to be formed into a solid positive electrode;

mixing crushed materials obtained by crushing the solid positive electrode with organic solvent so that a coating material made of the crushed positive electrode is prepared; and applying the coating material made of the crushed positive electrode to the surface of a formed conductive substrate.

6. A method of manufacturing an electrode according to claim 5, wherein the positive-electrode active material powder is cobalt acid lithium powder.

7. A method of manufacturing an electrode comprising the steps of:

crushing a negative-electrode plate in which negative-electrode active material layers comprising a thermoplastic binder, a negative-electrode active material and conductive substrates are crushed to form a powder comprising the thermoplastic binder, negative-electrode active material powder and crushed conductive substrates are held on a formed conductive substrate comprising copper foil;

separating the negative-electrode active material powder from the crushed conductive substrates;

mixing the negative-electrode active material powder with organic solvent so that a coating material is prepared; and applying the coating material to the surface of the formed conductive substrate.

8. A method of manufacturing an electrode according to claim 7, wherein the negative-electrode active material powder is carbon powder.

9. A method of manufacturing an electrode according to claim 7, wherein the negative-electrode plate is obtained by decomposing a spent battery.

10. A method of manufacturing an electrode comprising the steps of:

drying a coating material made of a negative-electrode mixture composed of negative-electrode active material powder, a thermoplastic binder and organic solvent so as to be formed into a solid negative electrode;

mixing crushed materials obtained by crushing the solid negative electrode with organic solvent so that a coating material made of the crushed negative electrode is prepared; and applying the coating material made of the crushed negative electrode to the surface of a copper foil substrate.

11. A method of manufacturing an electrode according to claim 10, wherein the negative-electrode active material powder is carbon powder.

* * * * *